United States Patent [19]
Yamaguchi

[11] Patent Number: 5,630,186
[45] Date of Patent: May 13, 1997

[54] MOVING BODY CAMERA

[75] Inventor: Yoshihisa Yamaguchi, Tokyo, Japan

[73] Assignee: Plusmic, Tokyo, Japan

[21] Appl. No.: 290,174

[22] Filed: Aug. 15, 1994

Related U.S. Application Data

[63] Continuation of Ser. No. 991,142, Dec. 16, 1992, abandoned.

[30] Foreign Application Priority Data

Dec. 24, 1991 [JP] Japan .................................. 3-356272

[51] Int. Cl.$^6$ ................................................ G03B 17/24
[52] U.S. Cl. .................................... 396/300; 396/315
[58] Field of Search ........................ 354/105, 106, 354/107, 108, 109, 354; 352/39; 346/107.2, 107.6

[56] References Cited

U.S. PATENT DOCUMENTS

| | | | |
|---|---|---|---|
| 3,082,424 | 3/1963 | Laird | 354/105 X |
| 3,829,869 | 8/1974 | Balko et al. | 354/109 X |
| 4,361,388 | 11/1982 | Mlcak et al. | 354/106 |
| 4,449,805 | 5/1984 | Sakurada et al. | 354/105 |
| 5,103,250 | 4/1992 | Arifuku et al. | 354/106 |
| 5,119,119 | 6/1992 | Amano et al. | 354/106 |
| 5,136,283 | 8/1992 | Nobs | 340/799 |
| 5,148,197 | 9/1992 | Kunishige | 354/106 |

FOREIGN PATENT DOCUMENTS

| | | |
|---|---|---|
| 0054762 | 6/1982 | European Pat. Off. . |
| 0055843 | 7/1982 | European Pat. Off. . |
| 3031100 | 4/1982 | Germany . |
| 1045434 | 10/1966 | United Kingdom . |

*Primary Examiner*—Howard B. Blankenship
*Attorney, Agent, or Firm*—Darby & Darby

[57] ABSTRACT

A photographing mechanism for a moving body camera, namely a slit camera, utilized for judgement of arrival order in horse race, etc. A light array 18 consisting of vertically arrayed plural LEDs is located closed to film 4. A light emission control box 17 illuminates and unilluminates the LEDs in response to dot data of characters to be recorded. Hence, as the film 4 is rewound, the film 4 is exposed by the LEDs, so that the characters are recorded on the film.

7 Claims, 4 Drawing Sheets

MOVING BODY CAMERA

This is a continuation of application Ser. No. 07/991,142, filed Dec. 16, 1992, now abandoned.

BACKGROUND OF THE INVENTION

1. Field of the Invention

The present invention relates to moving body cameras for taking photographs of objects and information characters which moving with high-speed, and more particularly, to those which are utilized for judging the arrival order in horse races, bicycle races, boat races, automobile races, and the like.

2. Background Art

Conventionally, there is known a moving body camera as shown in FIG. 6. FIG. 6 shows the schematic composition of a moving body camera and an application example of the camera utilized for judging the arrival order of horse races. In FIG. 6, the numeral 1 designates a moving body camera (hereafter, abbreviated as "camera"). The camera 1 principally contains a photographing mechanism 5 which takes photograph of an image 3 relating to an object 2 moving at high speed (i.e., race horses in FIG. 6, hereafter called "moving body") on a film 4 (i.e., silver film); a data recorder 7 which records related character data on the film 4 along with the image 3 located on the film; and a recording controller 8 which controls the data recorder 7.

The photographing mechanism 5, located on a perspective line M in parallel with a goal line 15, principally contains an object glass 9, a slit board 10 which has a slit 10a in front of film 4, a film supplier 11, and a chassis 12 which accommodates these components therein.

Furthermore, the data recorder 7 principally contains a rotating drum 13, a plurality of character indication boards 14, . . . ,14 which are fitted on the surface of rotating drum 13, and a driving motor (not shown) which rotates the rotating drum 13. The rotating drum 13 can be fitted with the plurality (for example, five) of character indication boards 14, . . . ,14 on its outer curved surface.

One character indication board 14 can indicate one chinese character or indicate two symbols (i.e., Japanese syllabary symbols), numerals or alphabetic characters. When required character indication boards 14, . . . ,14 are fitted on the outer curved surface of rotating drum 13, the character data (i.e., message), consisting of 5 characters for example, can be indicated. Further, the recording controller 8 is provided for controlling the driving motor in order to relate the rotation speed of rotating drum 13 with the feeding speed of film 4. The recording controller 8 and the data recorder 7 are connected together by cables.

In the camera 1, composed as described above, the photographing mechanism 5 is placed such that the image 3 relating to the moving body on the goal line 15 can be formed on the film 4 via the object glass 9 and the slit 10a. The film 4 is rewound in the opposite direction of that of the moving body 2 with a speed corresponding to that of the body 2. As a result, image of the moving body which passes through the goal line 15 is consecutively taken by the film 4.

In this case, the image of stationary objects (e.g. background) is always projected on the film 4 via the slit 10a, so that the image is taken by the film 4 as parallel straight lines, not as the actual shape of the objects. Furthermore, the data recorder 7 is located in front of the photographing mechanism 5 via the moving body 2 on the goal line 15, whereby the image of the character indication boards 14, . . . ,14 on the rotating drum 13 is formed on a data recording area 6 on film 4 via the object glass 9 and slit 10a. The recording controller 8 controls the rotation of character indication board 14 corresponding to the running speed of the film 4.

As a result, required character data is recorded in the data recording area 6 on film 4 along with the image 3 of the moving body. As for examples of the required character data, the name of the racecourse, the title of the race, the time of the race, and opening date, etc., may be enumerated. After the race is finished, the film 4 is developed and referees judge the order of arrival by means of visual observation of the developed film which shows the images of moving bodies. In this case, character data which indicates the racecourse, opening date, and time, etc., concerning to the race have been recorded together with the image, so that reliability of the film 4 can be improved. Furthermore, such records of character data are useful for film custody and classification.

However, in order to record the character data, the data recorder 7 in the conventional camera 1 utilizes the rotating drum 13 with character indication boards 14, . . . ,14, the number of which is subject to the circumference of the rotating drum 13, and is limited to a small number (five or so). Hence, if the information value of the message should be increased, abbreviations, ciphers and the like should be adopted for the message. For example, if the information "Tokyo Horse Racecourse, 2nd race; opened on 1987, 8 Dec. started at P.M. 1:00" should be recorded, the message on the five character indication boards 14, . . . ,14 should be abbreviated to "87", "TO", "2", "08", and "12". Therefore, the information indicated by the message is apt to be unclear.

Furthermore, the data recorder 7 which contains the rotating drum 13 and driving motor, etc., must be heavy and of large size. Furthermore, it is very troublesome to set the character indication boards 14, . . . ,14 on the rotating drum 13 and to exchange the boards.

There is known another technique which utilizes a vertical light array in place of the rotating drum 13 (Japanese Patent Laid-Open Publication No. 63-41446). However, the apparatus must be even larger and is expensive.

SUMMARY OF THE INVENTION

It is accordingly an object of the present invention to provide a moving body camera which relaxes the limitation concerning the quantity of the character data and contents of the message, allows easy operation to the character data, and can be compact and economical.

In the first aspect of the present invention, there is provided:

(a) a recording means which records a received image;

(b) a photographing mechanism which receives an image of a moving body via an object glass and a slit, and supplies the image of the moving body to the recording means;

(c) a plural of light emitting means which are located close to or in contact with the recording means, and are focusing light on a predetermined position on the recording means; and (d) a light emission control means which illuminates and unilluminates the light emitting means respectively in response to character data to be recorded by the recording means.

According to the invention, light emission control means illuminates and unilluminates the light emitting means in response to the character data to be recorded by the recording means. The light emitted by the light emitting means is focused and recorded by the recording means. Therefore, when the image in the recording means is played back, characters corresponding to the character data are indicated.

Therefore, this invention is advantageous in the quality of character data, flexibility of the contents of the character data, easy designation and handling of the characters, minimum size and low power consumption.

DESCRIPTION OF THE PREFERRED EMBODIMENT

Figure 6:
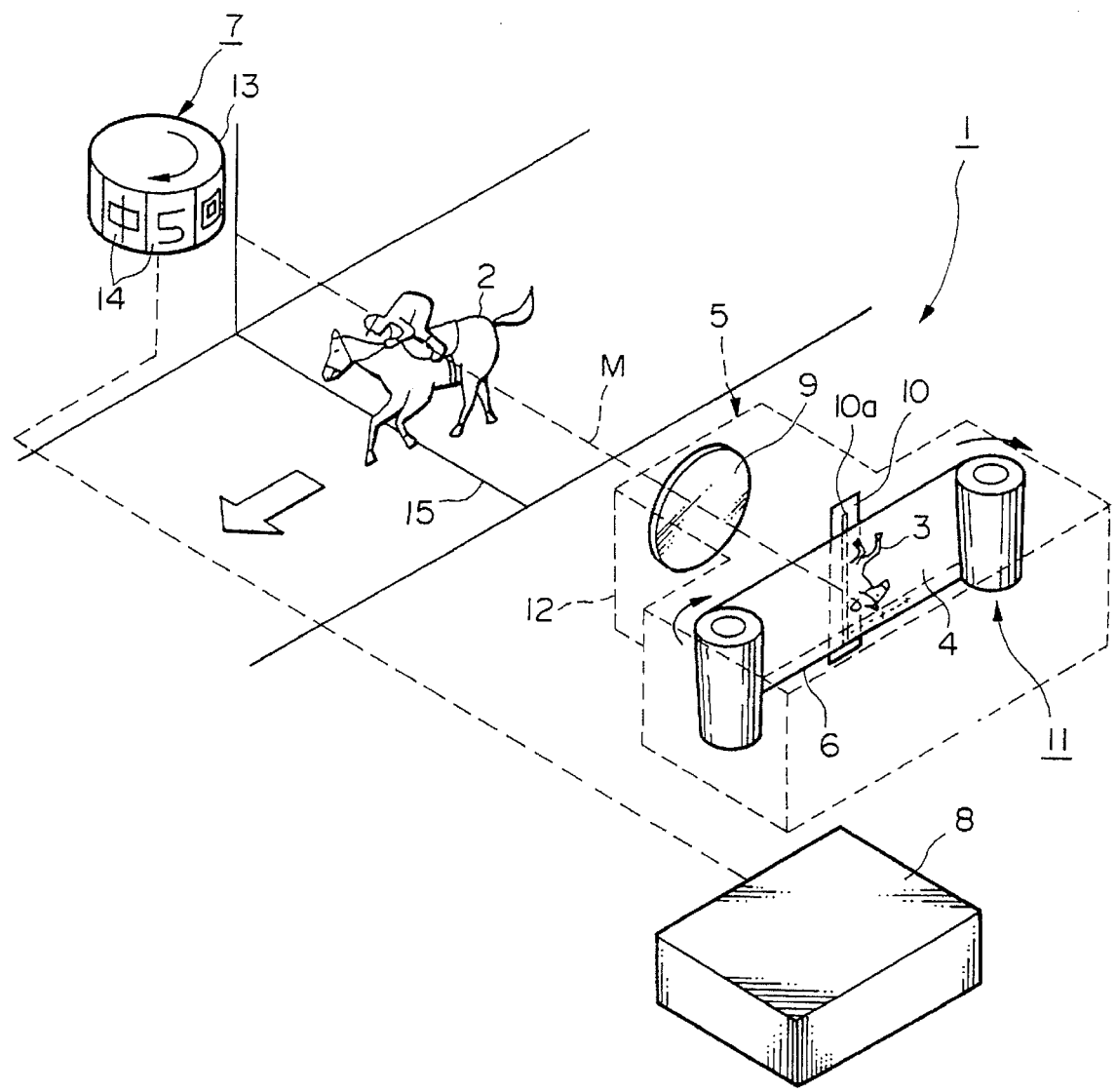
FIG. 6 is a schematic diagram of a conventional moving body camera.

In the following, a preferred embodiment of the present invention will be described with reference to FIGS. 1 to 4. In the drawings, components corresponding to those of FIG. 6 are labeled with the same numerals.

Figure 1:
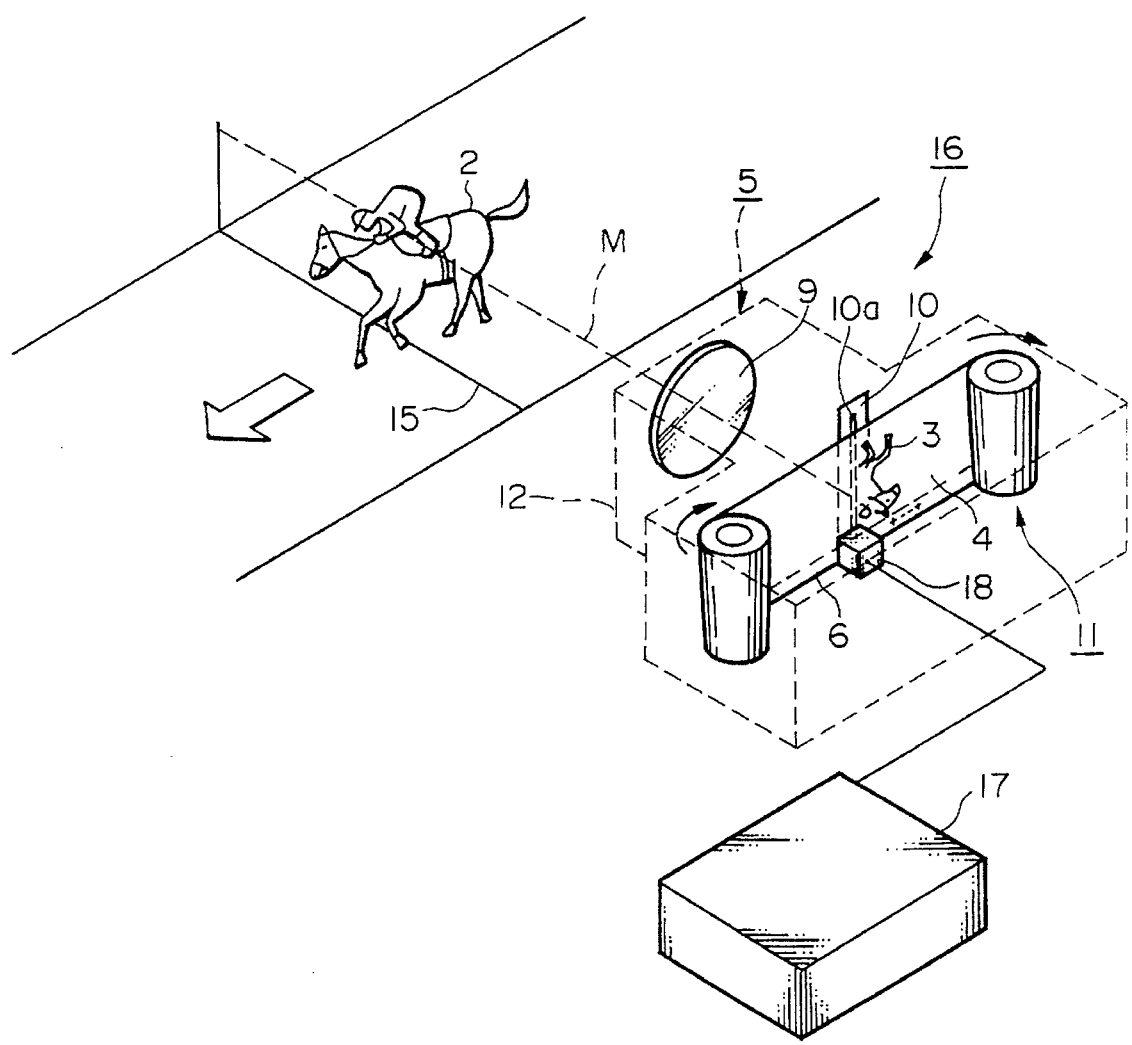
FIG. 1 is a schematic diagram of a moving body camera according to a preferred embodiment of the present invention.

In FIG. 1, the numeral 17 designates a light emission control box which is located at a suitable place for data input operation, etc., by an operator. The numeral 18 designates a light array which is located close to or in contact with the recording area 6 of film 4. The detailed composition of the light array 18 will be described with reference to FIG. 4.

Figure 4:
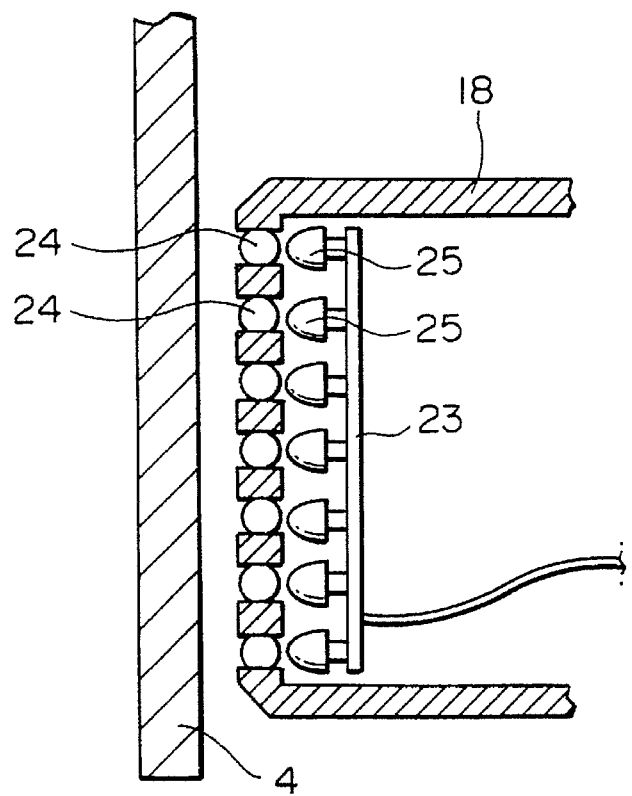
FIG. 4 is a sectional view of a light array 18.

In FIG. 4, a printed circuit board 23 contained in the light array 18 is provided with LEDs 25, ... ,25 on its surface. The LEDs 25, ... ,25 are arranged vertically at equal intervals. Furthermore, lenses 24, ... ,24 are located between the LEDs 25, ... ,25 and the film 4. Therefore, when the LEDs 25, ... ,25 respectively radiate light beams, the beams are focused by corresponding lenses 24, ... ,24 and images thereof are formed on the surface of film 4. The number of the LEDs 25, ... ,25 is preferably 7 to 16.

Next, composition of the light emission control box 17 will be described with reference to FIG. 2.

Figure 2:
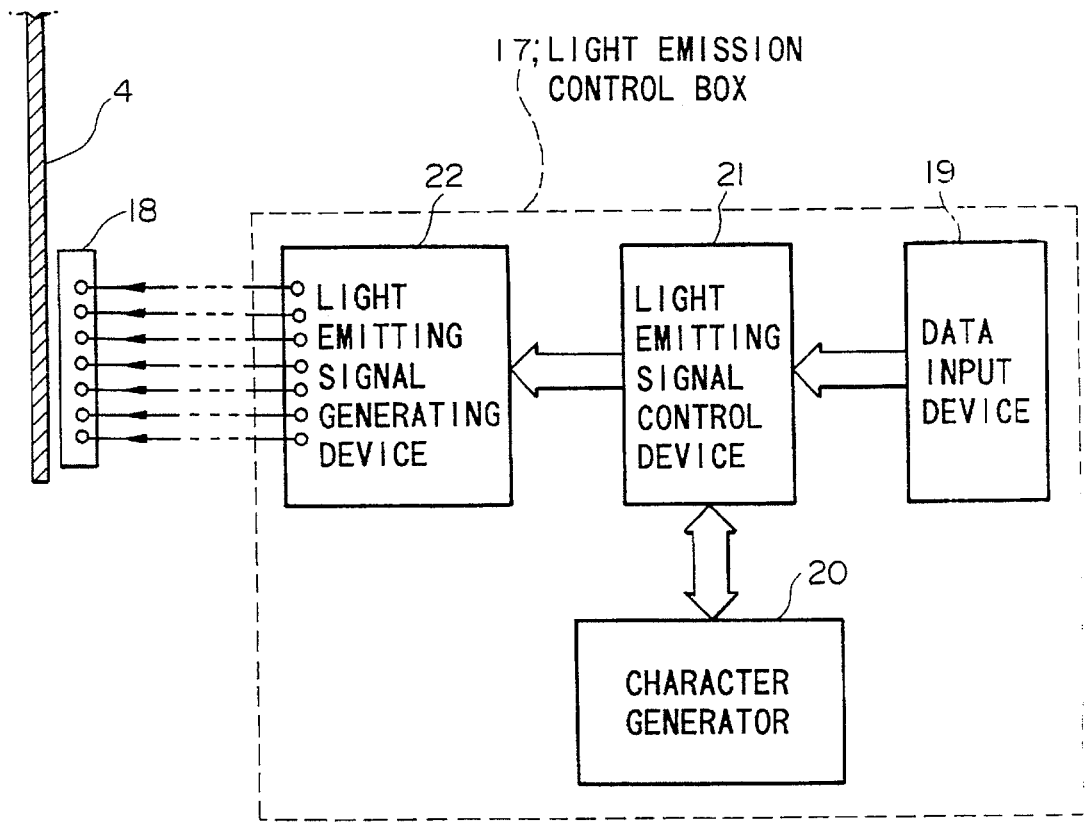
FIG. 2 is a partially block diagram of the embodiment.

In FIG. 2, the light emission control box 17 comprises a data input device 19, character generator 20, light emitting signal control device 21, and a light emitting signal generating device 22. The data input device 19, operated by the operator in order to input required character data, control instructions and the like, can be embodied by a keyboard with a ten-key and an encoder, and a magnetic recorder, etc. The operator inputs the character data "Tokyo Horse Racecourse, 2nd race; opened on 1991, 8 Dec., started at P.M. 1:00", for example, via the data input device 19.

Furthermore, the operator can input flash time (i.e., instaneous light emission time of LEDs 25, ... ,25), flash time interval (i.e., recording dot interval on film 4), and character intervals, etc., for control instruction data. The data input device 19 is further provided with a start-switch (not shown). This start-switch is automatically and simultaneously turned on when the moving bodies (ex. race horses) 2 make a start.

The character generator 20, comprising ROMs, stores dot patterns of chinese characters, Japanese syllabic characters, alphabetic characters, numerals, and symbols, etc. The light emitting signal control device 21, embodied by a microcomputer comprising a CPU (i.e., Central Processing Unit), ROMs and RAMs, receives character data and control instructions from data input device 19, reads out designated characters from the character generator 20, thereby creates dot data, and supplies the dot data to the light emitting signal generating device 22.

The light emitting signal generating device 22 converts the dot data, which is supplied by the light emitting signal control device 21, to a voltage signal, and supplies the voltage signal to the light array 18. More specifically, the light emitting signal generating device 22 has a plurality of output terminals, the number of which equals the number of LEDs 25, ... ,25, which are connected one by one to the corresponding LEDs 25, ... ,25. The light emitting signal generating device 22 applies a prespecified positive voltage to LEDs 25, ... ,25 when related dot data are "1", while applying zero voltage to the LEDs 25, ... ,25 when related dot data are "0".

As a result, corresponding LEDs 25, ... ,25 are simultaneously illuminated in response to the applied voltage. This illumination is sequentially repeated a predetermined number of times (for example, 7 to 16 times) per each character, corresponding to the running speed of the film 4. Accordingly, one desired character is recorded on the data recording area 6 of film 4.

Next, description will be made to an example of operation of this embodiment. First of all, the operator designates a message (i.e., character data) of "Tokyo Horse Racecourse, 2nd race; opened on 1991, 8 Dec., started at P.M. 1:00" together with instruction data of flash time, flash time intervals and character intervals by means of the data input device 19. The input signals of the message and instruction data are supplied to the light emitting signal control device 21. Then, the device 21 sequentially reads out corresponding character patterns from the character generator 20 and temporarily stores the character pattern in a buffer memory in the light emitting signal generating device 22.

The light emitting signal generating device 22 sequentially generates the light emitting signals (i.e., voltages) to the LEDs 25, ... ,25 in the light array 18 on the basis of control signals representing the flash time, flash period, etc., from the device 21, which are previously determined by the operator and stored in the buffer memory.

In this case, only a group of LEDs 25, ... ,25, to which the positive voltage is applied, radiate light beams. The radiated beams are then focused by the lenses 24, ... ,24 and expose the film 4.

Figure 3:
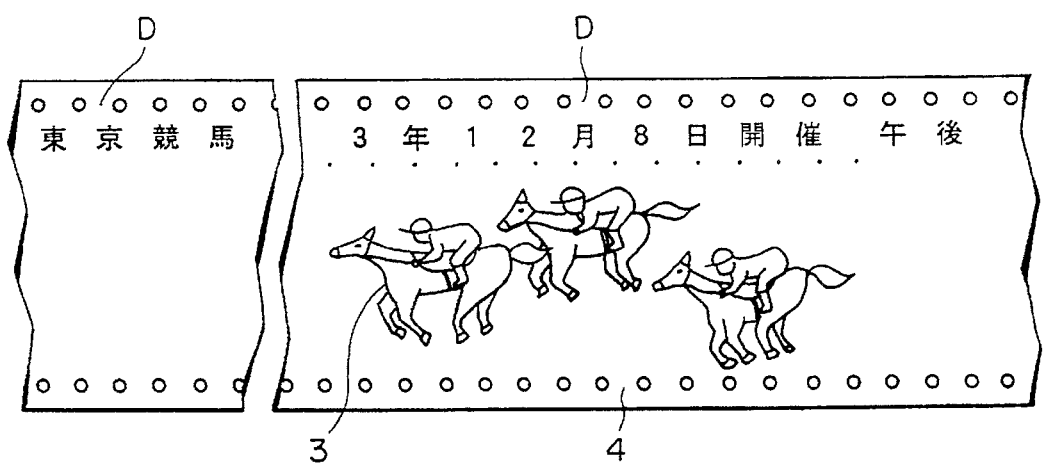
FIG. 3 is a plan view of the film with characters recorded therein.

FIG. 3 shows the film 4 which has recorded character data D. After the photograph is taken, referees observe the images of the moving bodies and judge the order of arrival. Furthermore, according to the embodiment, referees can easily recognize miscellaneous information such as the name of the racecourse, etc.

As described above, according to this embodiment, because the light array 18 comprises the LEDs 25, ... ,25, a large quantity of character data can be recorded. Furthermore, because the light emission control box 17 is provided with data input device 19 such as a keyboard, the character data can be designated easily and rapidly. Furthermore, because the light array 18 is located close to or in contact with the recording area 6, the array 18 can be compact and of low power consumption.

Furthermore, the present invention may be practiced or embodied in still other ways without departing from the spirit or essential character thereof.

For example, in the above-described embodiment, although the silver film 4 is utilized as the recording means, the recording means can be embodied by other photosensitive materials (for example, photomagnetoelectric materials), and by image pick-up devices. When the image pick-up devices are adopted, picked up image can be converted to digital signals and stored in semiconductor memory, etc.

Furthermore, according to the above-described embodiment, the light array 18 is provided with LEDs 25, . . . ,25, the number of which is 7 to 16. However, it is possible to increase the number of LEDs 25, . . . ,25 and to record characters in 24 dots, 32 dots, etc. In this case, a more distinct character can be indicated. In another purpose, two or three lines of characters can be simultaneously recorded. For example, the name of the racecourse and title of the race are recorded in the first line, the opening date is recorded in the second line, and the opening time is recorded in the third line.

Figure 5:
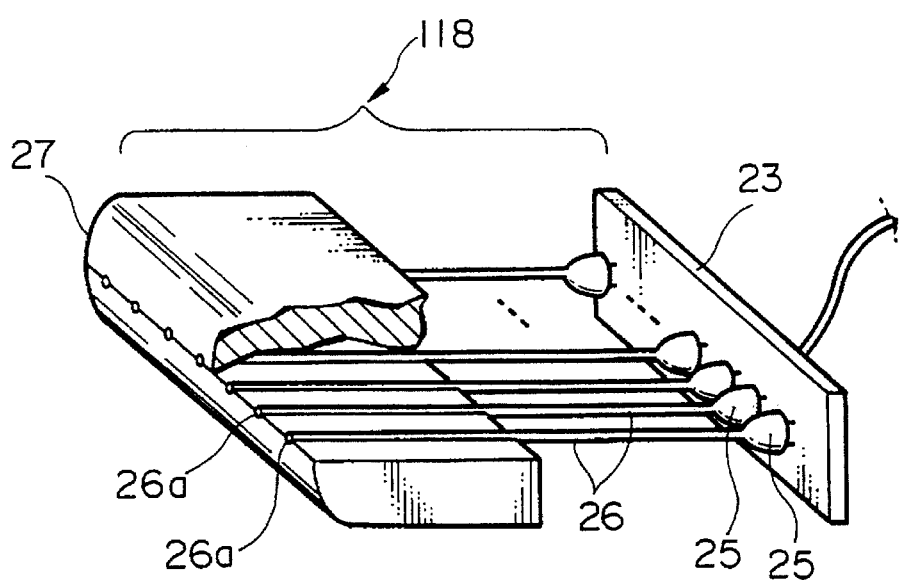
FIG. 5 is a perspective view of a modified light array 118 with parts removed.

In order to embody this technique, the light array 18 can be composed as shown in FIG. 5. In FIG. 5, the numeral 27 designates a head, which contacts the film 4, and is penetrated by optical fibers 26, . . . ,26 at the center. The one ends of optical fibers 26, . . . ,26 are exposed from the head 27, while the other ends of the fibers are respectively connected with corresponding LEDs 25, . . . ,25. Because the optical fibers 26, . . . ,26 can be manufactured slenderly, the number of the fibers and number of dots of the characters may be made larger, and appearance of the characters can be improved.

Furthermore, according to the above-described embodiment, the exclusive data recording area 6 is located on the upper side or lower side of the film 4. However, the character data can also be superimposed on the image of the moving bodies. Furthermore, the light emitting means are not restricted to the above-described LEDs 25, . . . ,25. That is, any devices which expose the film 4 or the alternative image pick-up devices can be utilized in place of the LEDs.

What is claimed is:

1. A moving body camera for use to determine an arrival order at a finish line of a race, said moving body camera comprising:

(a) recording means for recording a series of images of moving objects which pass the finish line sequentially;

(b) a photographing mechanism for receiving the images of the moving objects via an object glass and a slit, said slit being of a predetermined width to limit an area of viewing of said photographing mechanism to an area about said finish line, said photographing mechanism supplying said images of said moving objects to said recording means;

(c) a plurality of light emitting means which are placed in proximity to said recording means for focusing light on a predetermined position on said recording means;

(d) data creating means, manipulated by a human operator, for creating character data and control data in accordance with instructions given by the human operator, wherein the character data designate characters which represent information regarding the race, the control data designate control elements for the photographing mechanism;

(e) photographing mechanism control means for automatically controlling actuation of said photographing mechanism in response to the control elements designated by the control data;

(f) light emission control means for controlling illumination of said plurality of light emitting means in response to said character data so that said characters are automatically recorded sequentially in time by said recording means together with the images of the moving objects; and (g) means for rewinding said recording means so that the recording means is rewound in an opposite direction, which is opposite to a direction of movement of the moving objects with a speed that is controlled in response to a speed of the moving objects.

2. A moving body camera according to claim 1, wherein said recording means is a film.

3. A moving body camera according to claim 1, wherein said recording means is an image pick-up device.

4. A moving body camera according to claim 1, wherein said plurality of light emitting means are arrayed LEDs and lenses.

5. A moving body camera according to claim 1, wherein said plurality of light emitting means are LEDs and optical fibers, respectively, connected to said LEDs.

6. A moving body camera according to claim 1, wherein said character data are alphanumeric characters.

7. A moving body camera according to claim 1, wherein said character data are chinese characters.

* * * * *